United States Patent [19]

McCartney

[11] Patent Number: 4,511,605

[45] Date of Patent: Apr. 16, 1985

[54] PROCESS FOR PRODUCING POLISHING PADS COMPRISING A FULLY IMPREGNATED NON-WOVEN BATT

[75] Inventor: John R. McCartney, Westtown, Pa.

[73] Assignee: Norwood Industries, Inc., Malvern, Pa.

[21] Appl. No.: 552,713

[22] Filed: Nov. 17, 1983

Related U.S. Application Data

[63] Continuation-in-part of Ser. No. 500,015, Jun. 7, 1983, abandoned, which is a continuation of Ser. No. 306,946, Sep. 30, 1981, abandoned, which is a continuation-in-part of Ser. No. 188,330, Sep. 18, 1980, Pat. No. 4,342,805, which is a continuation-in-part of Ser. No. 188,329, Sep. 18, 1980, Pat. No. 4,376,148.

[51] Int. Cl.$^3$ .............................................. B05D 5/00
[52] U.S. Cl. .................................. 427/246; 427/342; 427/392; 427/439
[58] Field of Search ............... 428/220, 288, 290, 198, 428/904, 343, 349, 354; 427/246, 392, 439, 342

[56] References Cited

U.S. PATENT DOCUMENTS 4,171,391 10/1979 Parker ................................. 428/904

OTHER PUBLICATIONS

"Politex—The Right Porochemistry for Polishing," The GEOS Corporation, pp. 1 and 2.
"Polishing Media," The GEOS Corporation, No. 1, Feb. 1982, pp. 1 and 2.

Primary Examiner—Marion E. McCamish
Attorney, Agent, or Firm—Webb, Burden, Robinson & Webb

[57] ABSTRACT

A method for producing a polishing pad is disclosed. The method involves uniformly fully impregnating a fibrous batt with an aqueous polyurethane dispersion, coagulating the polyurethane dispersion to form an impregnant and drying the impregnant. The aqueous polyurethane dispersion may include colloidal silica. Heat and pressure are applied simultaneously to at least one surface of the impregnant to form a composite having a bulk density approaching the actual density of the impregnant at the polishing surface while maintaining microporosity throughout the structure. An adhesive is applied to the surface opposing the polishing surface to form an adhesive backed polishing pad. The polishing pad is comprised of a polymer homogeneously impregnated fibrous batt with the polishing surface having a bulk density approaching its actual density.

16 Claims, No Drawings

PROCESS FOR PRODUCING POLISHING PADS COMPRISING A FULLY IMPREGNATED NON-WOVEN BATT

CROSS-REFERENCE TO RELATED APPLICATIONS

This application is a continuation-in-part of U.S. patent application Ser. No. 500,015, filed June 7, 1983 now abandoned, which is a continuation of U.S. patent application Ser. No. 306,946, filed Sept. 30, 1981 now abandoned, which is a continuation-in-part of U.S. patent application Ser. No. 188,330 which is a continuation-in-part of Ser. No. 188,329, both filed Sept. 18, 1980, now U.S. Pat. Nos. 4,342,805 and 4,376,148, respectively.

BACKGROUND OF THE INVENTION

1. Field of the Invention

This invention relates to polishing pads and, more particularly, to polishing pads made from resin impregnated nonwoven material.

2. Description of the Prior Art

Integrated circuits are prepared primarily from pure silicon or germanium which is crystalline in form. Typically, the base for such integrated circuits is a slice or wafer of single crystalline silicon or germanium. A typical method of manufacturing the base is by starting with a single crystalline seed to produce a single crystal ingot. Typically, the single seed is placed in a silicon or germanium melt while appropriately orienting the crystal and maintaining the particular temperature in order to grow the crystal. In this manner, a single crystal ingot of 1 or 2 inches in diameter and several inches in length is produced. The cut wafers are about 10 mils thick or less. After slicing, the wafers are polished.

In polishing the wafers, the wafers are mounted on a flat surface such as a table or the like which has been moistened with water. The capillary action of the water adheres the individual wafers to the table. A polishing pad is placed in circular motion and contacts the wafers while an abrasive dispersion or slurry is injected so that the abrasive is interposed between the pad and the wafer. The polishing surface of the pad must be porous so that it can absorb the dispersion or slurry and act as a reservoir for supplying the dispersion or slurry at the interface between the pad and the wafer. The characteristics of the polishing pad are critical in that they must have an extremely smooth polishing surface. Further, the frictional and porosity characteristics of the pad are important because if the pad grips the wafers, the capillary force may be overcome and the wafers thrown from the table.

In accordance with the present invention, a polishing pad is provided which has a very smooth yet porous surface and the appropriate frictional characteristics required for the polishing of silicon or germanium wafers used as semi-conductors in integrated circuits.

BRIEF DESCRIPTION OF THE INVENTION

A method of producing polishing pads involves uniformly fully impregnating a fibrous batt with an aqueous polyurethane dispersion, coagulating the polyurethane dispersion to form an impregnated composite and drying the impregnated composite. The aqueous polyurethane dispersion may include colloidal silica. Heat and pressure are applied simultaneously to at least one surface of the impregnated composite to form a composite having a bulk density approaching the actual density of the impregnant at the polishing surface while maintaining microporosity throughout the structure. An adhesive is applied to the surface opposing the polishing surface to form an adhesive backed polishing pad. The polishing pad is comprised of a polymer homogeneously impregnated fibrous batt with the polishing surface having a bulk density approaching its actual density while maintaining porosity throughout the structure.

DETAILED DESCRIPTION OF THE INVENTION

"Bulk density" as used herein means and refers to the density of the material including air space. "Actual density" as used herein means and refers to the density of the material not including air space, i.e. specific gravity. The fibrous nonwoven mass useful in the practice of the invention is typically a needled fibrous batt formed of natural and synthetic fibers such as wool, polyester, polypropylene, rayon, nylon and the like and blends thereof. Preferably, the fibers have a denier of between 1 and 5 and a length which is suitable for carding which is typically 1 to 6 inches and, more preferably, 1½ to 3 inches.

The needled fibrous batts are typically 0.125 to 0.50 cm in thickness with a density of about 0.1 to 0.5 gm/cm$^3$ and, more preferably, a thickness of 0.08 to 0.3 cm with a density of 0.1 to 0.4 gm/cm$^3$. Most preferably, the fibers are synthetic fibers. Additionally, the batts are characterized as "saturating batts" which have high integrity due to the needle punching operation, as opposed to lightly bonded batts having few needle punches with little or no integrity.

The polymeric resins useful in the practice of the invention are preferably those polymeric resins which are capable of solubilization, dispersion, or emulsification in water and subsequent coagulation from the water system with a coagulating agent and preferably an ionic coagulation agent.

A polymer system which can be useful is one which is synthesized from acrylic monomers such as the alkyl acrylates and methylacrylates, acrylonitrile, methacrylonitrile and other well-known acrylic monomers. These acrylic monomers may be polymerized by emulsion polymerization to form a latex or by other free radical polymerization mechanisms and subsequently solubilized or emulsified in water. The emulsification or solubilization system must be such that when the emulsion is contacted with concentrated acid or base, the polymer coagulates from the aqueous system and is rendered substantially insoluble.

Most preferably, emulsified or aqueously dispersed polyurethanes are utilized. Exemplary of the emulsified polyurethanes are those disclosed in U.S. Pat. No. 2,968,575 prepared and dispersed in water with the aid of detergents under the action of powerful shearing forces. When these polyurethane emulsions are formed, the emulsifying agent or detergent must be one which is ionic in nature so that a counterion may be added to the aqueous system to coagulate the polymer. Most preferably, the polyurethanes useful in the practice of the invention are those recognized in the art as ionically water dispersible.

The preferred system for preparing ionic aqueous polyurethane dispersions is to prepare polymers that have free acid groups, preferably carboxylic acid groups covalently bonded to the polymer backbone.

Neutralization of these carboxyl groups with an amine, preferably a water soluble mono-amine, affords water dilutability. Careful selection of the compound bearing the carboxylic group must be made because isocyanates, necessary components in any polyurethane system, are generally reactive with carboxylic groups. However, as disclosed in U.S. Pat. No. 3,412,054, incorporated herein by reference, 2,2-hydroxymethyl substituted carboxylic acids can be reacted with organic polyisocyanates without significant reaction between the acid and isocyanate groups due to the steric hindrance of the carboxyl by the adjacent alkyl groups. This approach provides the desired carboxyl containing polymer with the carboxylic groups being neutralized with the tertiary mono-amine to provide an internal quaternary ammonium salt and hence water dilutability. Suitable carboxylic acids, and preferably the sterically hindered carboxylic acids, are well-known and readily available. For example, they may be prepared from an aldehyde that contains at least two hydrogens in the alpha position which is reacted in the presence of a base with two equivalents of formaldehyde to form 2,2-hydroxymethyl aldehyde. The aldehyde is then oxidized to the acid by procedures known to those skilled in the art. Such acids are represented by the structural formula,

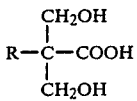

wherein R represents hydrogen or an alkyl group of up to 20 carbon atoms, and preferably, up to 8 carbon atoms. A preferred acid is 2,2-di-(hydroxymethyl)propionic acid. The polymers with the pendant carboxyl groups are characterized as anionic polyurethane polymers.

Further, in accordance with the present invention, an alternate route to confer water dilutability is to use a cationic polyurethane having pendant amino groups. Such cationic polyurethanes are disclosed in U.S. Pat. No. 4,066,591, incorporated herein by reference, and particularly, in Example XVII. In the context of the present invention it is preferred that the anionic polyurethane be used.

The polyurethanes useful in the practice of the invention, more particularly, involve the reaction of di- or polyisocyanates and compounds with multiple reactive hydrogens suitable for the preparation of polyurethanes. Such diisocyanates and reactive hydrogen compounds are more fully disclosed in U.S. Pat. Nos. 3,412,034 and 4,046,729. Further, the processes to prepare such polyurethanes are well recognized as exemplified by the aforementioned patents. In accordance with the present invention, aromatic, aliphatic and cycloaliphatic diisocyanates or mixtures thereof can be used in forming the polymer. Such diisocyanates, for example, are tolylene-2,4-diisocyanate; tolylene-2,6-diisocyanate; meta-phenylene diisocyanate; biphenylene-4,4'-diisocyanate; methylene-bis(4-phenyl isocyanate); 4-chloro-1,3-phenylene diisocyanate; naphthylene-1,5-diisocyanate; tetramethylene-1,4-diisocyanate; hexamethylene-1,6-diisocyanate; decamethylene-1,10-diisocyanate; cyclohexylene-1,4-diisocyanate; methylene-bis(4-cyclohexyl isocyanate); tetrahydronaphthylene diisocyanate; isophorone diisocyanate and the like. Preferably, the arylene and cyclo-aliphatic diisocyanates are used most advantageously in the practice of the invention.

Characteristically, the arylene diisocyanates encompass those in which the isocyanate group is attached to the aromatic ring. The most preferred aromatic isocyanates are the 2,4 and 2,6 isomers of tolylene diisocyanate and mixtures thereof, due to their ready availability and their reactivity. Further, the cyclo-aliphatic diisocyanates used most advantageously in the practice of the present invention are 4,4'-methylene-bis(cyclohexyl isocyanate) and isophorone diisocyanate.

The isocyanate is reacted with multiple reactive hydrogen compounds such as diols, diamines, or triols. In the case of diols or triols, they are typically either polyalkylene ether or polyester polyols. A polyalkylene ether polyol is the preferred active hydrogen containing polymeric material for formulation of the polyurethane. The most useful polyglycols have a molecular weight of 50 to 10,000 and in the context of the present invention, the most preferred is from about 400 to 7,000. Further, the polyether polyols improve flexibility proportionally with the increase in their molecular weight.

Examples of the polyether polyols are, but not limited to, polyethylene ether glycol, polypropylene ether glycol, polytetramethylene ether glycol, polyhexamethylene ether glycol, polyoctamethylene ether glycol, polydecamethylene ether glycol, polydodecamethylene ether glycol and mixtures thereof. Polyglycols containing several different radicals in the molecular chain, such as, for example, the compound $HO(CH_2OC_2H_4O)_nH$ wherein n is an integer greater than one, can also be used.

The polyol may also be a hydroxy terminated or hydroxy pendant polyester which can be used instead of or in combination with the polyalkylene ether glycols. Exemplary of such polyesters are those formed by reacting acids, esters or acid halides with glycols. Suitable glycols are polymethylene glycols such as ethylene, propylene, tetramethylene or decamethylene glycol; substituted methylene glycols such as 2,2-dimethyl-1,3-propane diol, cyclic glycols such as cyclohexanediol and aromatic glycols. Aliphatic glycols are generally used to impart flexibility to the polyurethane. These glycols are reacted with aliphatic, cyclo aliphatic or aromatic dicarboxylic acids or lower alkyl esters or ester forming derivatives to produce relatively low molecular weight polymers, preferably having a melting point of less than about 70° C. and a molecular weight like those indicated for the polyalkylene ether glycols. Acids for preparing such polyesters are, for example, phthalic, maleic, succinic, adipic, suberic, sebacic, terephthalic and hexahydrophthalic acids and the alkyl and halogen substituted derivatives of these acids. In addition, polycaprolactone terminated with hydroxyl groups may be used.

One particularly useful polyurethane system is the crosslinked polyurethane system which is more fully disclosed in U.S. patent application Ser. No. 947,544, filed Oct. 2, 1978 of Andrea Russiello entitled "Crosslinked Polyurethane Dispersions" incorporated herein by reference.

This crosslinked polyurethane system is preferred since once fused within the fibrous structure, it maintains its porosity. In contrast, true thermoplastic polyurethanes tend to coalesce during use of the polishing pad and seal the micropores. In addition, polishing pads based upon the crosslinked polyurethanes can be of higher density than those based upon thermoplastic urethanes. Typically, polishing pads having a density of up to 1.0 at the polishing surface can be produced using the crosslinked polyurethane whereas a maximum density of about 0.6 can be achieved using a thermoplastic polyurethane.

When used herein, "Ionic dispersing agent" means an ionizable acid or base capable of forming a salt with the solubilizing agent. These "ionic dispersing agents" are amines and preferably water soluble amines such as triethylamine, tripropylamine, N-ethyl piperidine, and the like; also, acids and preferably water soluble acids such as acetic, propionic, lactic, and the like. Naturally, an acid or amine will be selected contingent on the solubilizing group pendant on the polymer chain.

The desired elastomeric behavior for polyurethanes for production of the polishing pads generally requires about 25 to 80 percent by weight of a long chain polyol (i.e. 700 to 2,000 eq. wt.) in the polymer.

In forming the polyurethanes useful in the practice of the invention, the polyol and a molar excess of diisocyanate are reacted to form an isocyanate terminated prepolymer. Although suitable reaction conditions and reaction times and temperatures are variable within the context of the particular isocyanate and polyol utilized, those skilled in the art well recognize these variations. Such skilled artisans recognize that reactivity of the ingredients involved requires the balance of reaction rate with undesirable secondary reactions leading to color and molecular weight degradation. Typically, the reaction is carried out with stirring at about 50° C. to about 120° C. for about 1 to 4 hours. To provide pendant carboxyl groups the isocyanate terminated polymer is reacted with a molar deficiency of dihydroxy acid, for 1 to 4 hours at 50° C. to 120° C. to form the isocyanate terminated prepolymer. The acid is desirably added as a solution, for example, in N-methyl-1,2-pyrrolidone or N-N-dimethylformamide. The solvent for the acid will typically be no more than about 5 percent of the total charge in order to minimize the organic solvent concentration in the polyurethane composition. After the dihydroxy acid is reacted into the polymer chain, the pendant carboxyl groups are neutralized with an amine at about 58° to 75° C. for about twenty minutes and chain extension and dispersion are accomplished by addition to water with stirring. A water soluble diamine may be added to the water as an additional chain extender. The chain extension involves the reaction of the remaining isocyanate groups with water to form urea groups and further polymerize the polymeric material with the result that all of the isocyanate groups are reacted by virtue of the addition to a large stoichiometric excess of water. It is to be noted that the polyurethanes of the invention are thermoplastic in nature, i.e. not capable of extensive further curing after formation except by the addition of an external curing agent. Preferably, no such curing agent is added to form the composite sheet material.

Colloidal silica having an average particle size of less than about 50 nanometers in diameter may be added to the polyurethane dispersion. A suitable aqueous colloidal silica is sold by duPont Corporation under the trademark LUDOX, which is 50% silica having an average particle size of 22 nanometers, a viscosity of 35 centipoise, a sodium counterion and a pH of 9. The aqueous ionically-modified polyurethane and silica are compatible in all proportions. The preferred mixture has a polyurethane to silica ratio of 2:1 by weight on a dry basis, although the polyurethane to silica ratio may range from between 3:1 and 1:2.

Sufficient water is used to disperse the polyurethane at a concentration of about 10 to 40 percent by weight solids and a dispersion viscosity in the range of 10 to 1,000 centipoise. Viscosity may be adjusted in accordance with the particular impregnation properties desired and by the particular dispersion composition which are all dictated by the final product characteristics. It should be noted that emulsifiers or thickeners are not required for the stability of the dispersions.

The characterization of the dispersions prepared in accordance with the invention is done by measurements of nonvolatile content, particle size, viscosity measurements and by stress strain properties on strips of cast film.

The concentration range useful in the practice of the invention is governed by the desirable percent add on of polymer into the needled batt.

The dispersion viscosity is generally in the range from 10 to 1,000 centipoise. The low viscosity, relative to that of identical polymers at the same solids level in organic solvent polymer solutions, assists rapid and complete penetration of the aqueous dispersion and subsequent penetration of the coagulant. Useful polyurethanes will, in contrast, generally have viscosities of several thousand centipoise, ranging as high as 50,000 centipoise at concentrations of 20 to 30 percent.

The polymers should be impregnated into the fibrous batt at a level of at least 25 percent by weight add on based upon the weight of the fibrous batt and up to about 300 percent by weight add on. Preferably, the polymeric resin is impregnated at a level of about 50 to 150 percent by weight add on based upon the weight of the fibrous batt. The ratio of the polyurethane silica (dry basis) dispersion to fiber is between 1:1 and 3:1, and is preferably in the range of 1:1 and 1.5:1.

Less than 25 percent by weight add on provides an impregnant which cannot be compressed and set since there is insufficient polymer to securely bind the filaments in a permanent structure. Further, less than 25 percent add on does not provide sufficient integrity or surface continuity necessary in a polishing pad.

In determining percent add on of polymer, the final desired density of the polishing pad in light of the density of the starting fibrous batt must be considered. Final density can be achieved by varying polymer add on and the amount of mechanical densification performed on the impregnant. It is desirable to use as much mechanical densification as possible since the polymer is the more expensive constituent in the system.

Coagulation may be accomplished by contacting the impregnated substrate with an aqueous solution of an ionic medium designed to ionically replace the solubilizing ion. In theory, although not intended to be bound by such theory, in the case of an anionically solubilized polymer, the amine which neutralizes the carboxyl containing polyurethane is replaced with a hydrogen ion which reverts the anionic carboxyl ion thus reverting the polymer to its original "nondilutable" condition. This causes coagulation of the polymer within the substrate structure.

In the case of the anionic polymer, aqueous acetic acid solutions at concentrations of about 0.5 to about 75 percent are suitable ionic coagulants for the anionic dispersions and are preferred over stronger acids because of the relative ease of handling, low corrosion potential and disposibility.

Less volatile acids can be used when elevated temperatures are employed to accelerate coagulation. For example, rapid coagulation can be accomplished by using a maleic acid aqueous solution at temperatures up to about 95° C.

"Salting out" to coagulate the dispersion by the addition of the neutral salt is feasible but is not favored because of the large amounts of salt needed, about 10 times the concentration of acid, and attendant problems of product contamination.

In addition, the polymer may be thermally coagulated by the incorporation of a compound which generates counterions displacing the solubilizing ion. For example, in the case of anionic dispersions, sodium or potassium silicofluoride at low levels may be added in order to generate sufficient anions when heated to displace the solubilizing cation thus causing coagulation.

In cases where the polyurethane dispersion contains colloidal silica, the preferred method of coagulation is thermal coagulation at a temperature of between 60° and 80° C. for a few seconds. This procedure does not require the use of a heat activated coagulant, such as sodium or potassium silicofluoride. Thus, the finished product does not include crystalline residues, such as fluorides, that may score the surface to be polished.

In impregnating the needled batt with the polymeric resin as contemplated herein, the batt is immersed in an aqueous ionic emulsion or dispersion at a concentration level sufficient to provide an add on of at least 25 percent by weight. Upon immersion of the batt in the aqueous emulsion or dispersion, the batt may be squeezed to remove air to provide full impregnation of the emulsion or dispersion within the batt. The batt, now fully impregnated with the aqueous dispersion or emulsion, is passed through wiping rolls or the like to remove excess dispersion or emulsion on the surface of the impregnated batt. The batt is then immersed in a bath containing the counterion to provide coagulation with the counterion containing material permeating the batt through diffusion and providing coagulation of the resin within the fibrous structure. After coagulation, the batt is squeezed to remove excess water and dried to form an impregnant.

In the case of thermal coagulation, subsequent to full impregnation, the batt is heated and the heat permeates the structure generating counterions and causing coagulation.

In addition to solids concentration of the dispersion, squeezing of the impregnated batt can be used to regulate polymer add on. This squeezing compresses the impregnated structure discharging polymer therefrom and upon return to original dimension generates void space within the structure. However, squeezing is less preferred than full impregnation since full impregnation provides the most desirable final structure.

The impregnation as used herein is based upon U.S. Pat. No. 4,171,391 incorporated herein and also upon the processes disclosed in parent applications of this application which are both incorporated herein by reference.

After the impregnated composite is dried, it may be split through its thickness by conventional leather splitting techniques to form several sheets for densification under heat and pressure. As an alternative to splitting, the original batt can be of a thickness and density so that it can be directly densified without splitting. In addition, prior to densification the impregnated composite is shaved to provide a uniform surface so that the final polishing pad surface has minimum deviation.

The impregnated nonwoven sheet material is pressed with heat to densify the structure to develop strength, durability and general integrity while maintaining porosity throughout the structure.

In one technique the heat and pressure is sufficient to fuse the polymer to itself to form a polishing pad with a uniform density throughout while maintaining porosity throughout the structure.

In another technique the heat and pressure is sufficient to fuse the polymer to itself within the impregnated composite at the surface of the material, but yet insufficient to completely fuse the polymer at the interior or opposing side of the sheet material. This process develops a density gradient from the interior of the nonwoven sheet material to the exterior surface or surfaces. The dimensions of the gauge of the heated and pressed sheet material can be regulated by the pressure applied during heating and pressing operations or by the insertion of spacers between the press plates, by the use of a dead load press or by use of a molding press. There are several techniques for developing the density gradient to produce the polishing pads. The impregnated composite can be placed between two heated plates, thus developing a bulk density equal to the actual density on the two exterior surfaces and subsequently splitting the material to form two base polishing pad sheets.

Preferably, the pressure applied is between 20 and 1500 psi. Also preferably the temperature of the heat applied is between 130° and 180° C. After hot pressing, the bulk density of the impregnated composite is between 0.3 and 0.7 gm/cm$^3$.

In another process for forming the polishing pads, the impregnated nonwoven starting material previously discussed can be placed in a press with only one of the plates heated to form the surface with a bulk density equal to the actual density while having the opposing side of the impregnant on a cool plate forming the lower bulk density surface.

And yet another process for forming the base polishing pad material, two pieces of the impregnated composite can be mounted upon each other in a press and heat and pressure applied sufficient to fuse the polymer to itself within the impregnated composite at the outer surface of each piece. After pressing, the individual pieces are separated resulting in two polishing pad base sheets.

Preferably the plates of the press are extremely smooth to avoid surface deviation and can be constructed of polished chromium surfaced steel or the like.

In all cases, the porosity of the polishing pad is maintained throughout the structure.

The selection of a uniform density polishing pad over a pad with a density gradient is dependent on the application for the pad. If the polishing surface is to be on the face of the pad, a density gradient material is preferred since the lower density opposing surface provides resilience in polishing. If the edge surface is used for polishing, a uniform density material is more desirable.

Typically, the impregnant is pressed at 200 to 1,500 psi at a temperature range of about 130° to 180° C. After pressing, the polishing pad base material is shaved at the nonpolishing side to a uniform thickness, preferably about 50 mils. The final composition is about 30 to 60 percent fiber and 40 to 70 percent polymer.

The pressed side, which acts as the polishing surface, has a surface deviation of 15 microns or less, and preferably, 6 microns or less, over one square meter.

Further, the impregnant may be heat embossed with interconnected channels. Thus, the polishing fluid is readily uniformly distributed across the entire surface of the polishing pad. The central area of the pad, particularly in pads 50 to 60 inches in diameter, is difficult to wet in flat surface pads. Failure to wet the central area of the pads can lead to optical distortion due to the development of frictional heat in the dry central areas. The polishing fluid may be aqueous silica, water, an aqueous alkali or non-aqueous liquid.

A pressure sensitive adhesive is then applied to the opposing side of the polishing pad surface for mounting on a disc for use in the polishing process.

The process of forming the polishing pads in accordance with the invention can be further understood with reference to the following examples.

EXAMPLE 1

A needled batt which was heat set and had a basis weight of 1200 gm/m$^2$, a density of 0.16 gm/cm$^3$, and 300 mils thick composed of polyester, polypropylene and rayon fibers was uniformly fully impregnated with a 40 percent aqueous dispersion of a polyurethane polymer based upon isophorone diisocyanate and polytetramethylene ether glycol, 2000 average molecular weight which had dimethylpropionic acid co-reacted therein and dispersed by the addition of an amine thereto. The impregnated batt was coagulated in a 20 percent acetic acid bath, washed with water and dried. The impregnated composite had a density of 0.4 gm/cc. The impregnated composite was split into four 50 mil thick pieces by conventional leather splitting techniques. One of the splits was placed in a molding press with plates of polished chromium surfaced steel and pressed at 300° F. to a thickness of 50 mils and a density of 0.6 gm/cm$^3$. The final composition had 30 percent fiber and 70 percent polymer. The pad had a uniform density and was porous throughout. The base pad material as produced was cut into a 27 inch disc and a pressure sensitive adhesive was applied to one side. The polishing surface deviation on the heated and pressed side was less than two microns for a 27 inch disc. The polishing pad was adhered by the pressure sensitive adhesive to a rotating support and silicon wafers were polished therewith while an abrasive dispersion was applied during the polishing operation. The wafers so polished had excellent surface characteristics and were not thrown from the table.

The polishing pads in accordance with the invention are characterized by having a bulk density approaching the actual density at the polishing surface while maintaining porosity throughout the pad structure.

Further, in accordance with the present invention, the polishing pads except for the adhesive, are similar to the material as is described and claimed in U.S. patent application Ser. No. 188,330, entitled "Simulated Leather Sheet Material," filed Sept. 18, 1980, a parent of this application.

EXAMPLE 2

A polyester felt having a basis weight of 543 gm/m$^2$ was formed of a woven polyester fabric having a basis weight of 51 gm/m$^2$ and faced on both sides with a needled polyester staple fiber having a basis weight of 246 gm/m$^2$ needled to the woven fabric. The composite of woven fabric and staple fiber was calendered to a thickness of 1.85 mm and had a width of 151 cm.

An aqueous dispersion of 35% polyurethane polymer was prepared based upon tolylene diisocyanate and polytetramethylene ether glycol, 2000 average molecular weight which had dimethylpropionic acid co-reacted therein and dispersed by the addition of an amine thereto. The aqueous polyurethane dispersion was combined with a 50% aqueous dispersion of colloidal silica in which the colloidal silica had a particle size of 10 millimicrons. The mixture was two parts polyurethane to one part silica (dry basis) by weight, had a pH of 8.2 and a viscosity of 90 centipoise.

The polyester felt was led continuously from a roll at 3 m/min. through a saturating vessel providing 30 seconds of immersion in the dispersion and between wiping rolls set to allow for full saturation. The saturated batt was dried by being led continuously over an infrared radiant heater 150 cm in length and through a sequence of drying rolls having a surface temperature of 150° C. providing a total contact with the roll surfaces of 13 minutes. One hundred meter lengths of the dried composite were wound in continuous rolls 150 cm wide. The final product contained 120 parts of the polyurethane silica mixture per 100 parts of reinforced felt.

The dried felt was suitable for further processing to form a polishing pad by any of the well-known techniques.

Although the invention has been described with reference to specific materials and specific processes, the invention is only to be limited so far as is set forth in the accompanying claims.

I claim:

1. A method of producing a polishing pad comprising:
   uniformly fully impregnating a fibrous batt with an aqueous polymer dispersion;
   coagulating the dispersion within the fully impregnated batt to form an impregnated composite;
   simultaneously drying the impregnated composite;
   applying pressure to the impregnated composite and heating at least one surface thereof to form a composite in which the polymer is fused to itself and the at least one heated surface becomes denser and suitably smooth and flat to comprise a polishing surface; said composite having a bulk density at the polishing surface approaching the actual density while maintaining porosity throughout the structure; and
   applying an adhesive to a surface opposing the polishing surface to form a polishing pad.

2. The method of claim 1 wherein said fibrous nonwoven batt is about 0.08 to 0.03 centimeters in thickness with a bulk density of about 0.1 to 0.5 gm/cm$^3$.

3. The method of claim 1 wherein said aqueous dispersion is an aqueous polyurethane dispersion.

4. The method of claim 3 wherein said polyurethane aqueous dispersion is comprised of an ionically solubilized polyurethane polymer.

5. The method of claim 4 wherein said polyurethane is coagulated by the addition of an ionic coagulating agent.

6. The method of claim 1 wherein said polyurethane is a crosslinked thermoplastic such that while it will fuse during pressing, it will not fuse when used as a polishing pad and the porosity will thereby remain open.

7. The method of claim 1 wherein said aqueous dispersion further comprises colloidal silica.

8. The method of claim 7 wherein said colloidal silica has an average particle size less than about 50 nanometers.

9. The method of claim 7 wherein said colloidal silica is present at between three parts polyurethane to one part silica (dry basis) by weight and one part polyurethane to two parts silica (dry basis) by weight.

10. The method of claim 9 wherein said colloidal silica is present at about two parts polyurethane to one part silica (dry basis) by weight.

11. The method of claim 7 wherein said aqueous dispersion has a total solids content of about 40% by weight.

12. The method of claim 7 wherein the ratio of said aqueous dispersion to fiber in the finished product is between 1:1 and 3:1 by weight.

13. The method of claim 1 wherein said heat is applied to said impregnant in a range of about 130° to 180° C.

14. The method of claim 1 wherein said pressure is applied at about 200 to 1500 psi.

15. The method of claim 1 wherein said impregnated composite has a bulk density of about 0.3 to 0.7 gm/cm$^3$.

16. The method of claim 1 including shaving said impregnant to a predetermined thickness.

* * * * *

UNITED STATES PATENT AND TRADEMARK OFFICE
CERTIFICATE OF CORRECTION

PATENT NO. : 4,511,605

DATED : April 16, 1985

INVENTOR(S): John R. McCartney

It is certified that error appears in the above-identified patent and that said Letters Patent is hereby corrected as shown below:

Claim 2 - Column 10 Line 53 "0.03" should read --0.30--.

Signed and Sealed this

Twenty-seventh Day of August 1985

[SEAL]

Attest:

DONALD J. QUIGG

Attesting Officer

Acting Commissioner of Patents and Trademarks